US008954362B2

United States Patent
Vishwakarma

(10) Patent No.: US 8,954,362 B2
(45) Date of Patent: Feb. 10, 2015

(54) SYSTEM AND METHOD FOR PREDICTIVE ANALYTICS IN AN ELECTRICAL GRID NETWORK

(75) Inventor: Devendra Vishwakarma, Indore (IN)

(73) Assignee: Infosys Limited, Bangalore (IN)

(*) Notice: Subject to any disclaimer, the term of this patent is extended or adjusted under 35 U.S.C. 154(b) by 488 days.

(21) Appl. No.: 13/246,754

(22) Filed: Sep. 27, 2011

(65) Prior Publication Data

US 2013/0006903 A1 Jan. 3, 2013

(30) Foreign Application Priority Data

Jun. 29, 2011 (IN) .......................... 2190/CHE/2011

(51) Int. Cl.
G06F 15/18 (2006.01)
H02J 3/00 (2006.01)
G06Q 10/04 (2012.01)
G06Q 50/06 (2012.01)

(52) U.S. Cl.
CPC . *H02J 3/00* (2013.01); *G06Q 10/04* (2013.01); *G06Q 50/06* (2013.01); *H02J 2003/007* (2013.01); *Y04S 40/22* (2013.01); *Y02E 60/76* (2013.01)

USPC .......................................................... 706/18

(58) Field of Classification Search
None
See application file for complete search history.

(56) References Cited

U.S. PATENT DOCUMENTS 8,316,155 B2 * 11/2012 Liu et al. ....................... 709/248
2011/0279469 A1 * 11/2011 Hao et al. ..................... 345/582

OTHER PUBLICATIONS

Ku-Mahamud "Flood Pattern Detection Using Sliding Window Technique", 2009 Third Asia International Conference on Modelling & Simulation, pp. 45-50.*

* cited by examiner

*Primary Examiner* — Li-Wu Chang
(74) *Attorney, Agent, or Firm* — Klarquist Sparkman, LLP

(57) ABSTRACT

Systems and methods for performing predictive analytics in an electrical grid network are disclosed. In one example of the disclosed technology, a method comprises aggregating a plurality of events from an electrical grid network, analyzing the plurality of events to recognize at least one event pattern, serializing at least one of the event patterns in a database, and predicting a future event pattern based on a correlation of the plurality of event patterns.

30 Claims, 6 Drawing Sheets

SYSTEM AND METHOD FOR PREDICTIVE ANALYTICS IN AN ELECTRICAL GRID NETWORK

CROSS REFERENCE TO RELATED APPLICATION

This application claims the benefit of and priority to prior Indian patent application number 2190/CHE/2011, entitled "SYSTEM AND METHOD FOR PREDICTIVE ANALYTICS IN AN ELECTRICAL GRID NETWORK," filed on Jun. 29, 2011, the entire disclosure of which is hereby incorporated herein by reference.

FIELD

The present disclosure relates to the field of electrical grids. In particular, the disclosed technology relates to systems and methods of monitoring performance and reliability in electrical grids.

BACKGROUND

Electrical grids are networks for delivering electricity from electricity suppliers to consumers. Smart grids are electrical grids that use two-way digital communications technology to control and monitor power consumption at consumption points or appliances attached to the electrical distribution network. Some of the advantages of smart grids include saving energy, improved reliability, and reduction in cost.

An electrical grid is composed of networked equipment whose performance and reliability is dependent on parameters such as atmospheric temperature, humidity, reliability of its component parts, age of equipment, system load, and other parameters. Equipment failure is usually attributed to one or more of the above-mentioned parameters. There are instances where failure of a single equipment component leads to failure of several other equipment components attached to the electrical grid, or to disruption in electrical supply. These disruptions are due to equipment failure or mechanisms to protect the grid from spreading the failure. Hence, it becomes complex to accurately determine which combination of parameters led to the equipment failure or to a cascade of failures in subsequent equipment connected to the electrical distribution network.

While there are methods in electrical equipment control systems that indicate failure using diagnostic tests to monitor performance and reliability metrics of individual equipment, these diagnostic tests report failure only after an event has occurred. Often, causes of equipment failure are directly related to multiple parameters measured from the electrical grid equipment over a period of time.

Therefore, there is a particular need for methods and systems that predict reliability and performance metrics of the electrical grid equipment using available historic and real-time measurements.

SUMMARY

One aspect of the disclosed technology relates to computer-implemented methods of predictive analytics in an electrical grid network. In some examples, a method includes aggregating a plurality of events observed in an electrical grid network. The aggregated events are then analyzed to recognize an event pattern in the plurality of events aggregated from electrical grid network. The event pattern is then serialized in a database. Based on the plurality of event patterns that are recognized, a future event pattern can be predicted by correlation.

Another aspect of the disclosed technology relates to systems for predictive analytics in an electrical grid network. In some examples, a system comprises an integration module that receives a plurality of events from an electrical grid network. Using the plurality of events, an analysis module is configured to recognize a plurality of event patterns based on the plurality of events. The event patterns recognized by the analysis module are then stored in a database. A prediction module predicts a future event pattern based on one or more correlations of event patterns.

Another aspect of the disclosed technology relates to computer-implemented methods for monitoring performance and predicting equipment reliability. In some examples, a method comprises aggregating a plurality of events observed in electrical equipment connected to the electrical grid network, applying a time-slice parameter to the events, and analyzing the events within the selected time-slice to recognize event patterns. The event patterns that are recognized are then stored in a database. Using the event patterns, future event pattern can be predicted based on one or more correlations of the event patterns. Accuracy of the predicted event pattern can be determined by using an accuracy parameter. The time-slice parameter can be adjusted in order to increase the accuracy parameter.

Another aspect of the disclosed technology relates to systems for monitoring performance and predicting reliability of equipment. In some examples, a system comprises an integration module that aggregates a plurality of events using measurements from at least one equipment component connected to an electrical grid network. An analysis module is configured to apply a time-slice parameter to the plurality of events to recognize at least one event pattern within the time-slice. A database is configured to store the time-slice parameter and at least one event. A prediction module is configured to predict a future event pattern based on one or more correlations of the plurality of event patterns. A feedback module is configured to determine an accuracy parameter by comparing the predicted future event pattern with an actual event and adjusting the time-slice parameter to increase the accuracy parameter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
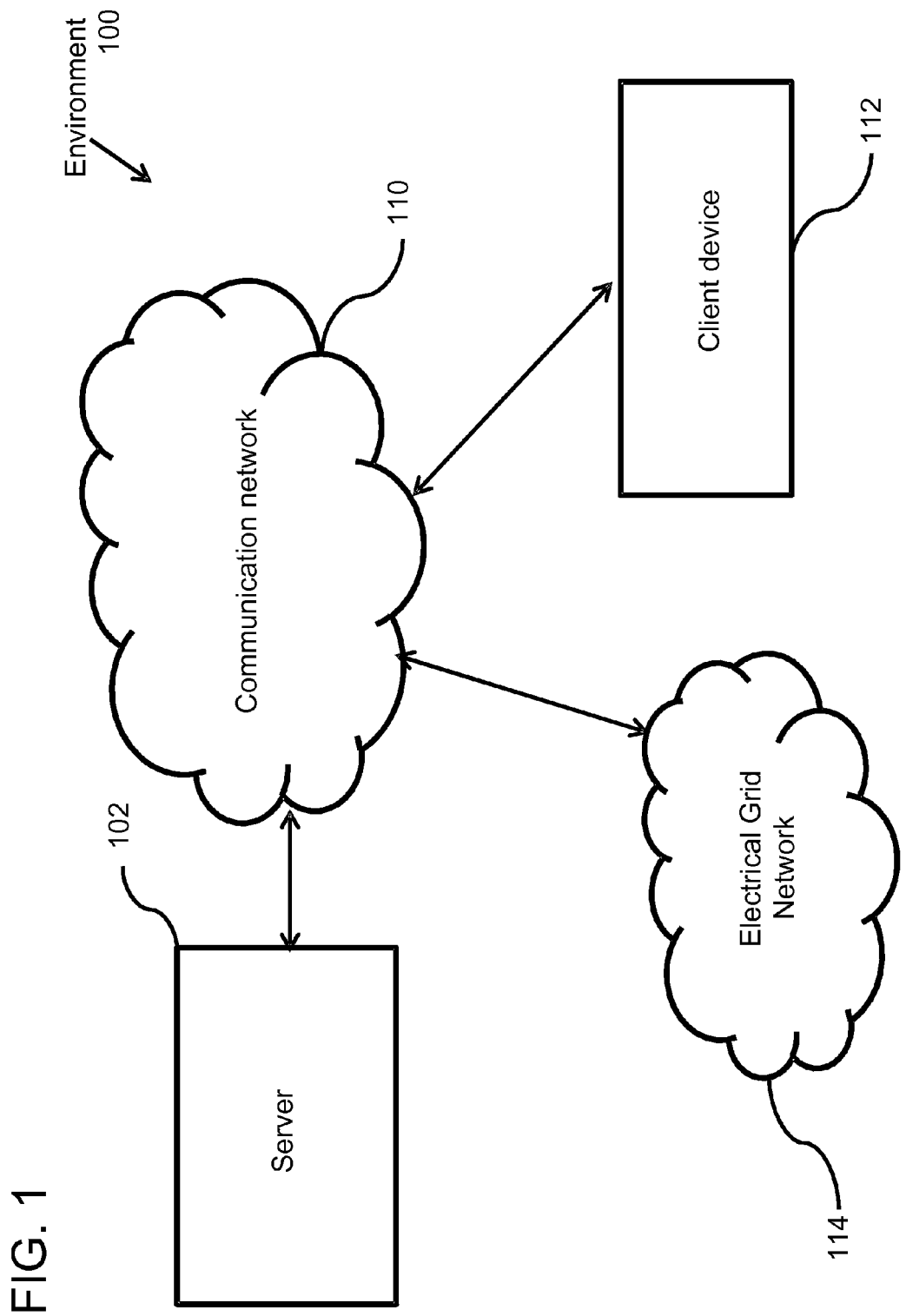
FIG. 1 shows an environment in which some examples of the disclosed technology can be implemented.

The following description is a full and informative description of the best methods and systems presently contemplated for carrying out the present invention known to the inventors at the time of filing of this patent application. Of course, many modifications and adaptations will be apparent to those of ordinary skill in the relevant arts in view of the following description, the accompanying drawings, and the appended claims. While the systems and methods described herein are provided with a certain degree of specificity, the disclosed technology may be implemented with either greater or lesser specificity. Further, some of the features of the disclosed technology can be used without the corresponding use of other features described herein. As such, the present description should be considered as merely illustrative of the principles of the present technique and not in limitation thereof.

The present disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented with computer-executable instructions stored on one or more computer-readable storage media (e.g., non-transitory computer-readable media, such as one or more volatile memory components (such as DRAM or SRAM), or nonvolatile memory components (such as hard drives) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, JavaScript, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

FIG. 1 depicts a computing environment 100 in which aspects of the disclosed technology can be practiced. The computing environment 100 includes a server 102, a communication network 110, a client device 112, and an electrical grid network 114.

The server 102 is used as an application server that performs the business logic functions. The server 102 also acts as a database where information received from the electrical grid network 114 and the client device 112 is stored. The server 102 is connected to the client device 112 over the communication network 110. The server 102 is also connected to the electrical grid network 114. The server 102 receives information from the electrical grid network 114 using the communication network 110. The client device 112 communicates with the server 102 using the communication network 110 for receiving and sending information.

Figure 2:
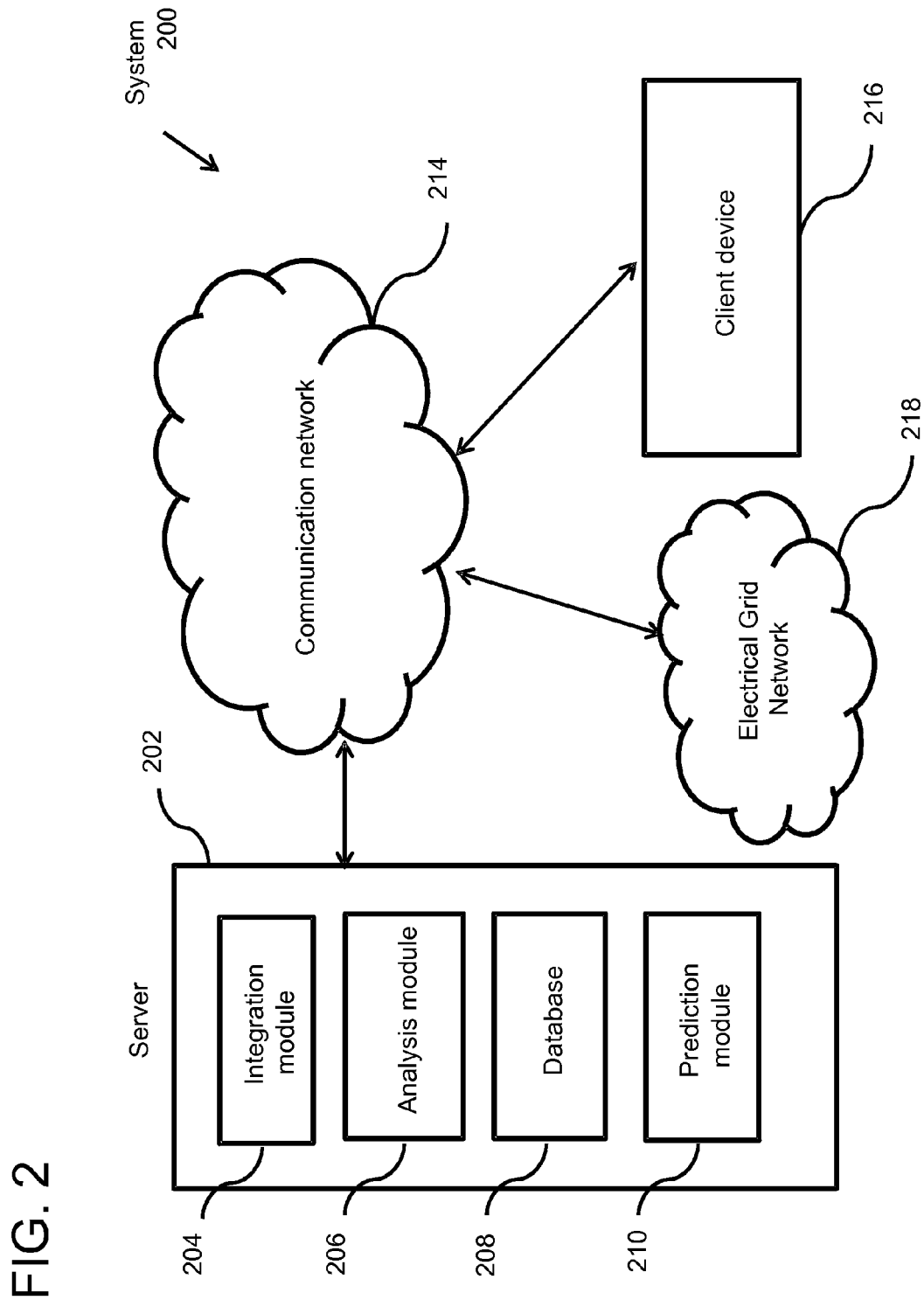
FIG. 2 is a block diagram of a system in which some examples of the disclosed technology can be implemented.

FIG. 2 is a block diagram of a system 200 in which aspects of certain embodiments can be practiced. The system 200 comprises a server 202, a network 214, an electrical grid network 218, and a client device 216. The server 202 has an integration module 204, an analysis module 206, a database 208, and a prediction module 210.

As shown, the integration module 204 communicates with the electrical grid network 218 using the communication network 214 to collect events from an electrical grid network. The electrical grid network comprises electrical power transmission equipment for transfer of power from power generation plants to electricity consumers. The events collected from the electrical grid network can include non-operational assets, equipment measurements, alerts, alarms, and weather events. Historic measurements of events are also part of the database. The integration module 204 can also communicate with supervisory control and data acquisition (SCADA) systems to collect information from the electrical grid network. SCADA refers to control systems that monitor and control electricity supply infrastructure or facilities.

The analysis module 206 performs the function of analyzing the events from the electrical grid network to recognize an event pattern. The input to the analysis module is in the form of a time series with events from the electrical grid network.

In accordance with one embodiment of the disclosed technology, the analysis module can use time domain correlation to analyze the events time series are received from the electrical grid network. Time domain correlation can be performed using autocorrelation. Autocorrelation is the cross-correlation of the events time series with itself.

For example, let 'X' be an event that is repeatable and 'i' a point in time after the start of the events. Then '$X_i$' is the value of an event measurement at time 'i'. The auto correlation between two points in time series 's' and 't' can be defined as:

$$R(s, t) = \frac{E[(Xt - \mu t)(Xs - \mu s)]}{\sigma t \, \sigma s}$$

Where, E is the expectation operator, $\mu_s$ and $\mu_t$ are the mean values at times 's' and 't', $\sigma_t^2$, and $\sigma_s^2$ are known variance values at times 't' and 's'.

The autocorrelation operation generates information about repeating events. An example of a repeating event is one or more adverse effects on electrical power transmission caused by storm weather. An autocorrelation operation of a time series tracking power outages caused by storms generates patterns of storm-related power outages. After the time domain correlation, the patterns found are stored in the database 208. The prediction module 210 reads the database for the correlation patterns and historic measurements from the electrical grid network. The prediction module 210 predicts future event patterns using regression analysis. An example of prediction of future event patterns can be performed using a linear regression in order to assess the association between time and frequency of outages. In case of a linear regression, the relationship between time 'x' and frequency of outages 'y' is given by the following equation:

$$y = 1 + bx$$

Where 'a' is the intercept point of regression line and the y-axis; 'b' is the slope of the regression line. Slope of the regression line can be calculated using the following equation:

$$b = \frac{(N \sum xy - \sum x \sum y)}{N \sum x^2 - (\sum x)^2}$$

and intercept a is calculated using the following equation:

$$a = \frac{\sum y - b \sum x}{N}$$

Using historic information from electrical grid network and the regression equation y=a+bx, prediction is performed.

In another embodiment of the disclosed technology, the integration module 204 receives events from operations technology systems and information technology systems. Suitable examples of operations technology systems include power supply instrumentation and control systems. Suitable examples of information technology systems include a software application or a web service that acts as a source for events.

In another embodiment of the disclosed technology, the events received at the integration module 204 are data cleansed by removing incorrect data. The data cleansing can be performed by replacing, modifying, or deleting the event related data. Data cleansing is performed to ensure high quality data is to be used by the system.

Figure 3:
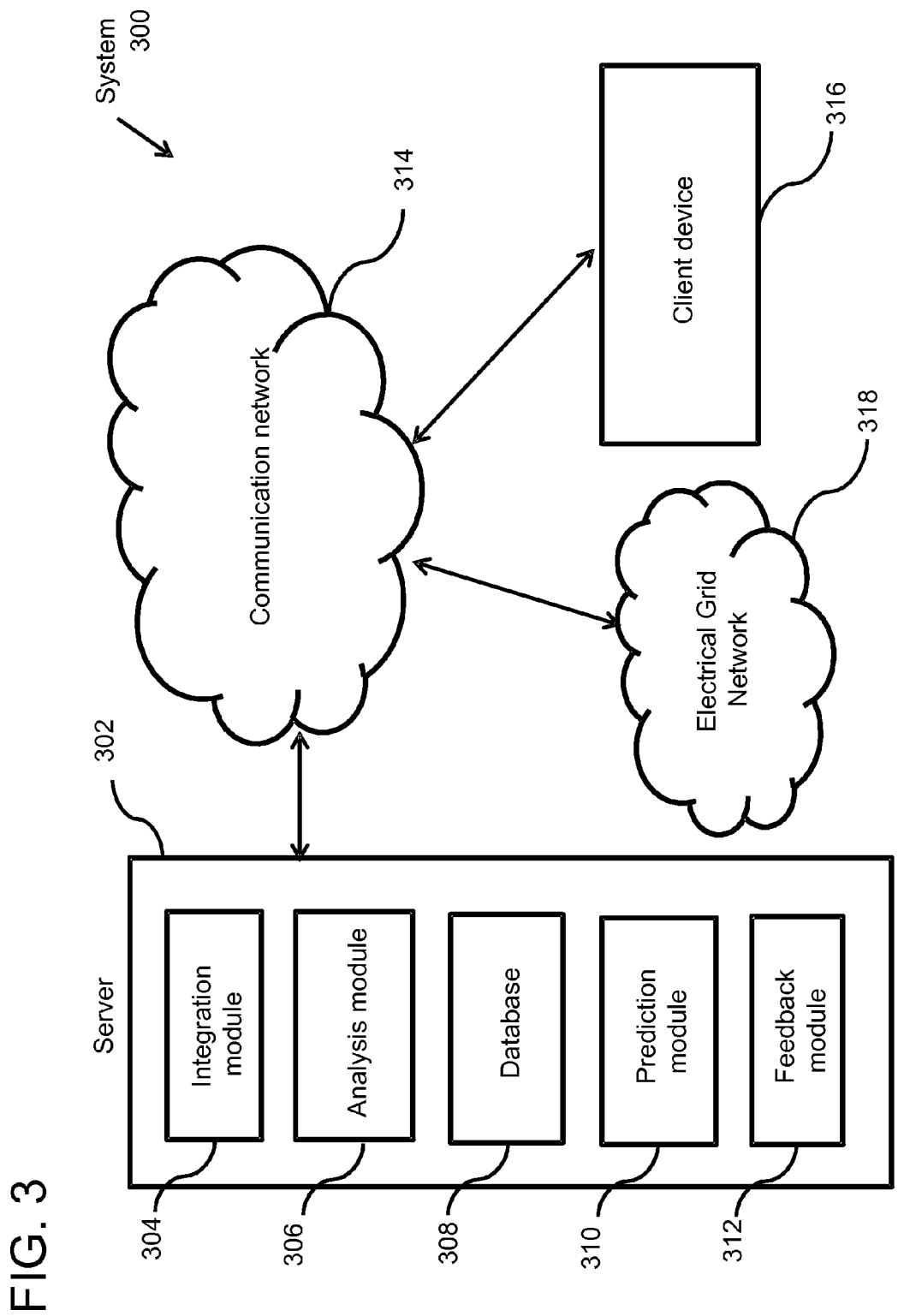
FIG. 3 shows an environment in which some examples of the disclosed technology can be implemented.

FIG. 3 is a block diagram of a system 300 in which certain aspects of the disclosed technology can be practiced, in accordance with another exemplary embodiment. The system 300 comprises a server 302, a communication network 314, an electrical grid network 318, and a client device 316. The server 302 has an integration module 304, an analysis module 306, a database 308, a prediction module 310, and a feedback module 312.

It should be noted that details of various components shown in the figure, namely, the server 302, a communication network 314, the electrical grid network 318, the client device 316, integration module 304, the analysis module 306, the database 308, the prediction module 310 have been described earlier in conjunction with FIG. 2 and hence, are not described again. The analysis module applies a time-slice parameter to the events time series and analyzes events within the time-slice in order to recognize an event pattern. The feedback module 312 performs the function of determining the accuracy of the predicted event by comparing the actual events with historic values of electrical grid network from the database. An accuracy parameter can be defined as the ratio of the number of events predicted and the number of actual events that occurred. The feedback module also adjusts the time-slice parameter in order to increase the accuracy parameter.

Figure 4:
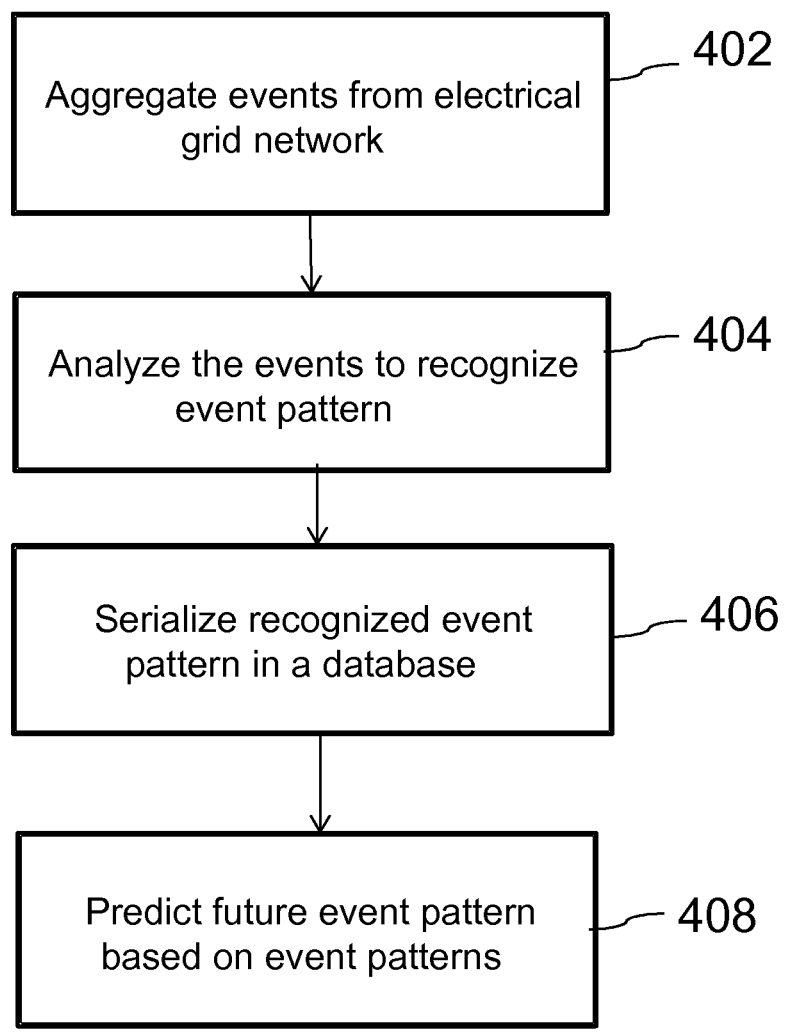
FIG. 4 is a flowchart of a method in accordance with some examples of the disclosed technology.

FIG. 4 is a flowchart 400 of an exemplary method for predictive analytics in an electrical grid network, in accordance with certain embodiments of the disclosed technology.

Events from an electrical grid network are aggregated at process block 402. The events include measurements from equipment and information technology systems that are connected to the electrical grid network.

At process block 404, one or more events from the electrical network are analyzed to recognize event patterns. This analysis is performed using at least one of time domain or frequency domain correlation. Time domain correlation is performed using correlation operations. Examples of correlation operations can include auto correlation and cross correlation. Frequency domain correlation is performed using mathematical transform operations. Examples of mathematical transformations can include Fast Fourier Transform and Fractional Fourier Transform.

The event patterns are stored in the database at process block 406. Examples of suitable databases include relational databases, temporal databases, flat file databases, and object oriented databases.

At process block 408, future events are predicted using the event patterns stored in the database. Examples of methods suitable for predicting future events include regression analysis, Monte-Carlo simulation, artificial neural network, recurrence quantification analysis, correlation dimension, and nonlinear autoregressive exogenous model.

Figure 5:
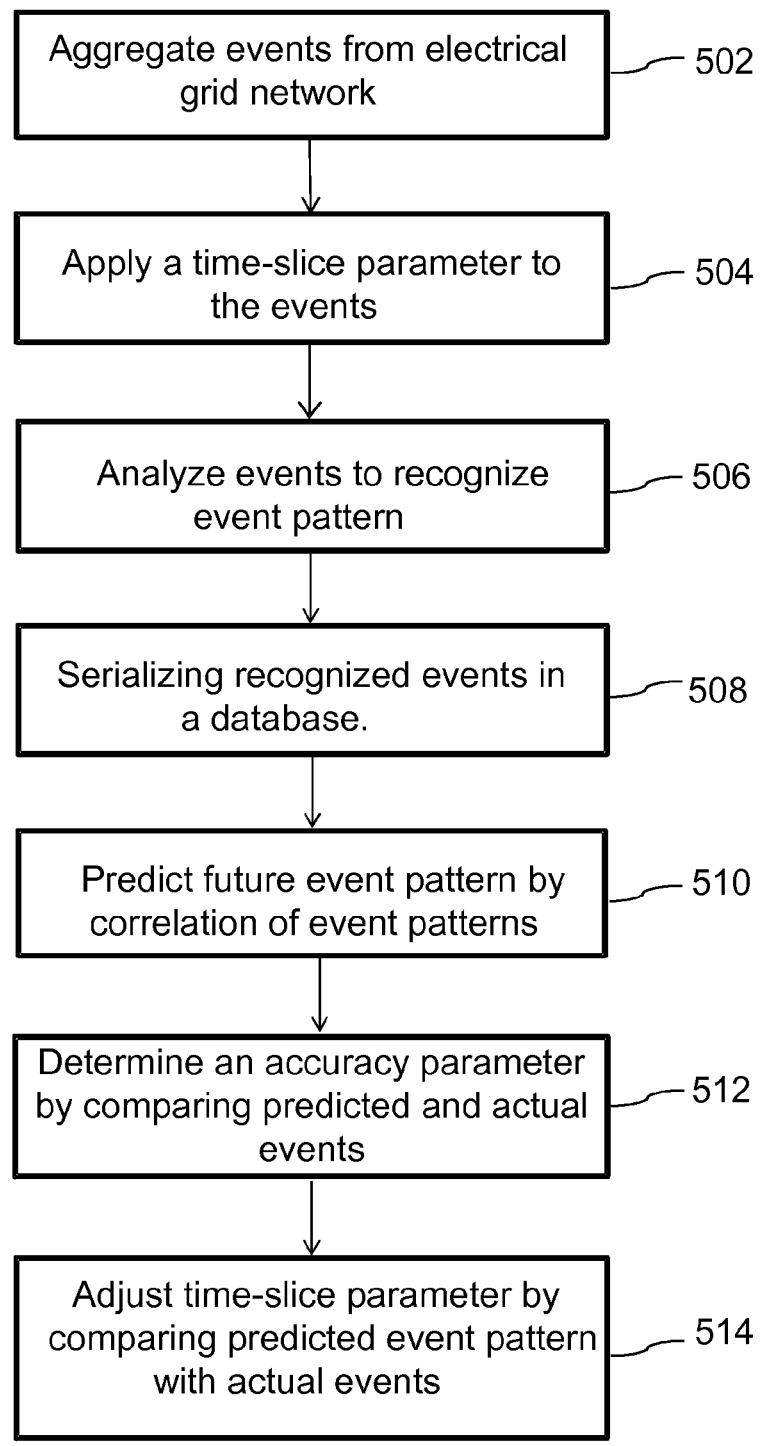
FIG. 5 is a flowchart of a method in accordance with some examples of the disclosed technology.

FIG. 5 is a flowchart 500 of a method for predictive analytics in an electrical grid network, in accordance with certain embodiments of the disclosed technology.

Events from an electrical grid network are aggregated at process block 502. The events include measurements from equipment and information technology systems that are connected to the electrical grid network.

A time-slice parameter is applied to the events at process block 504. A time-slice parameter is a fixed duration of time within which one or more of the events are analyzed in subsequent acts. This operation result in multiple time-slices with fixed time duration, and within each time-slice are one or more events.

At process block 506, the events from the electrical network are analyzed to recognize event patterns within each time-slice obtained in process block 504. This analysis is performed using at least one of time domain or frequency domain correlation. Time domain correlation is performed using correlation operations. Examples of suitable correlation operations include auto correlation and cross correlation. Frequency domain correlation is performed using mathematical transform operations. Examples of suitable mathematical transformations include Fast Fourier Transform and Fractional Fourier Transform.

The event patterns recognized within each time-slice are stored in a database at process block 508. Examples of suitable databases include relational databases, temporal databases, flat file databases, and object oriented databases.

Future event patterns are predicted at process block 510 using the event patterns stored in the database at process block 508. Examples of suitable methods that can be used for prediction include regression analysis, Monte-Carlo simulation, artificial neural network, recurrence quantification analysis, correlation dimension, and nonlinear autoregressive exogenous model.

At process block 512, an accuracy parameter is found by comparing actual events with the predicted events obtained at process block 510. An example of a suitable accuracy parameter is the difference between the number of predicted events and the number of actual events.

The accuracy parameter is used to adjust the time-slice parameter at process block 514. A time-slice parameter is increased or decreased based on the accuracy parameter. By increasing or decreasing the time-slice parameter, the accuracy parameter, which is a measure of accuracy of prediction, is optimized. The time-slice parameter is usually measured in units of time, for example in seconds or minutes.

Exemplary Computing Environment

Figure 6:
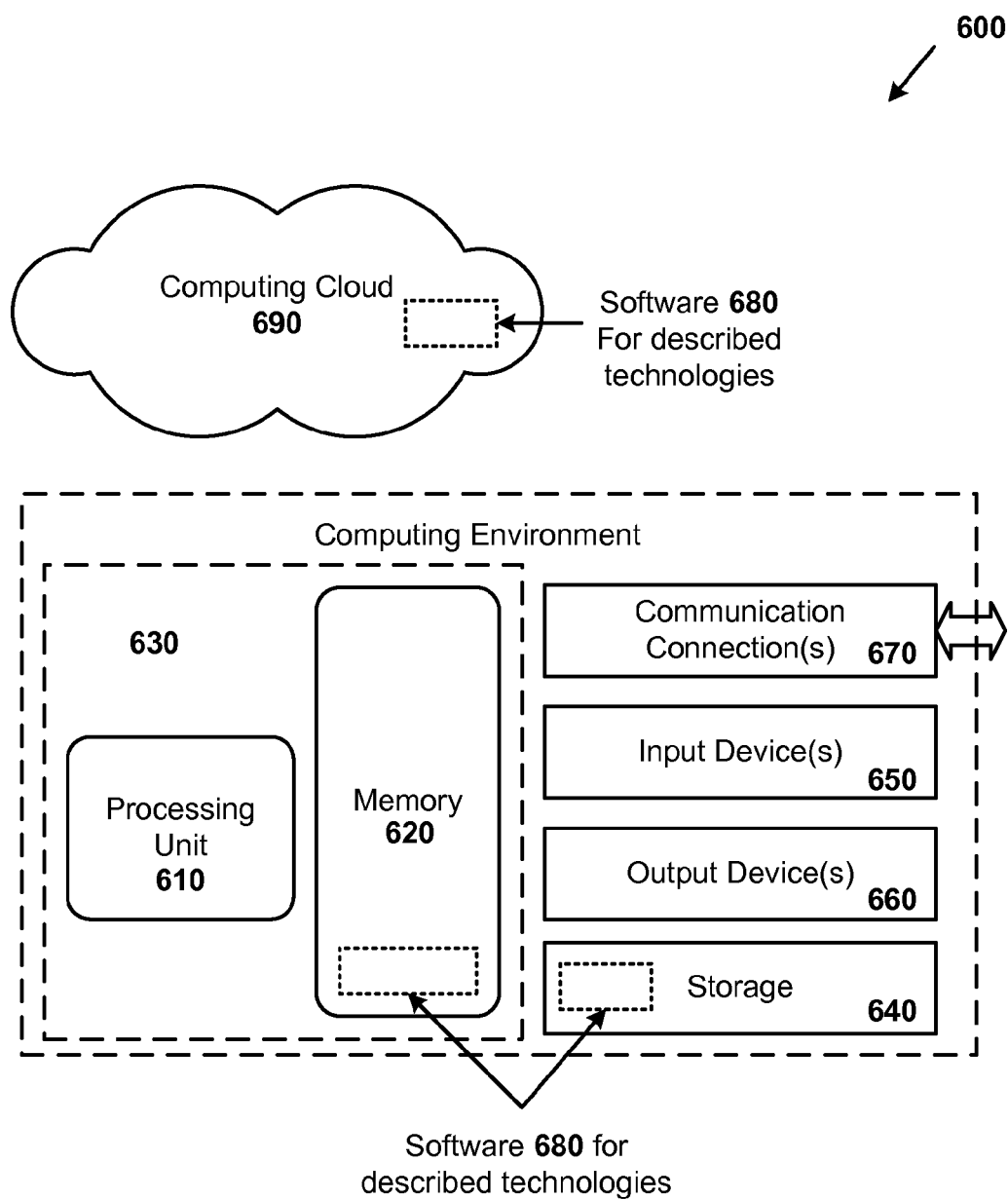
FIG. 6 illustrates a generalized example of a suitable computing environment in which described embodiments, techniques, and technologies can be implemented.

FIG. 6 illustrates a generalized example of a suitable computing environment 600 in which described embodiments, techniques, and technologies can be implemented. For example, the computing environment 600 can implement the disclosed systems and methods for performing predictive analytics in an electrical grid network, as can be used in accordance with certain embodiments of the disclosed technology.

The computing environment 600 is not intended to suggest any limitation as to scope of use or functionality of the technology, as the technology can be implemented in diverse general-purpose or special-purpose computing environments. For example, the disclosed technology can be implemented with other computer system configurations, including hand held devices, multiprocessor systems, microprocessor-based or programmable consumer electronics, network PCs, minicomputers, mainframe computers, and the like. The disclosed technology can also be practiced in distributed computing environments where tasks are performed by remote processing devices that are linked through a communications network. In a distributed computing environment, program modules can be located in both local and remote memory storage devices.

With reference to FIG. 6, the computing environment 600 includes at least one central processing unit 610 and memory 620. In FIG. 6, this basic configuration 630 is included within a dashed line. The central processing unit 610 executes computer-executable instructions and can be a real or a virtual processor (e.g., ultimately executed on processor hardware). In a multi-processing system, multiple processing units execute computer-executable instructions to increase processing power and as such, multiple processors can be running simultaneously. The memory 620 can be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment can have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing, in the computing environment 600, and coordinates activities of the components of the computing environment 600.

The storage 640 can be removable or non-removable, and includes magnetic disks, magnetic tapes or cassettes, CD-ROMs, CD-RWs, DVDs, or any other medium which can be used to store information and that can be accessed within the computing environment 600. The storage 640 stores instructions for the software 680, which can implement technologies described herein.

The input device(s) 650 can be a touch input device, such as a keyboard, keypad, mouse, touch screen display, pen, or trackball, a voice input device, a scanning device, or another device, that provides input to the computing environment 600. For audio, the input device(s) 650 can be a sound card or similar device that accepts audio input in analog or digital form, or a CD-ROM reader that provides audio samples to the computing environment 600. The output device(s) 660 can be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 690. For example, performing predictive analytics in an electrical grid network can be performed on servers located in the computing cloud 690.

Computer-readable media are any available media that can be accessed within a computing environment 600. By way of example, and not limitation, with the computing environment 600, computer-readable media include memory 620 and/or storage 640. As should be readily understood, the term computer-readable storage media includes the media for data storage such as memory 620 and storage 640, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Any of the methods described herein can be implemented by computer-executable instructions stored in one or more computer-readable storage devices (e.g., memory, magnetic storage, optical storage, or the like). Such instructions can cause a computer to perform the method.

Having described and illustrated the principles of my innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of embodiments shown in software can be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims and their equivalents.

I claim:

1. A method for predictive analytics in an electrical grid network implemented at least in part by a computer, comprising:
    aggregating a plurality of events from an electrical grid network, the plurality of events comprising information related to adverse effects on equipment of the electrical grid network and measurements performed by the equipment;
    cleansing the plurality of events by modifying the incorrect event based on associated time stamp information;
    analyzing one or more corrected events to recognize one or more event patterns;
    serializing the one or more event patterns in a database; and
    predicting a future event pattern based on a correlation of the plurality of event patterns.

2. The method of claim 1, wherein the plurality of events comprise a measurement history database, an alerts database, an alarm database, and a weather history database.

3. The method of claim 1, wherein the plurality of event patterns is indicative of past events and present events.

4. The method of claim 1, wherein the analyzing the plurality of events is performed using time domain correlation.

5. The method of claim 4, wherein the time domain correlation is performed using auto correlation.

6. The method of claim 4, wherein the time domain correlation is performed using cross correlation.

7. The method of claim 1, wherein the analyzing the plurality of events is performed using frequency domain correlation.

8. The method of claim 7, wherein the frequency domain correlation is performed using mathematical transforms.

9. The method of claim 7, wherein the frequency domain correlation is performed using a Fast Fourier transform.

10. The method of claim 7, wherein the frequency domain correlation is performed using Fractional Fourier transforms.

11. The method of claim 1, wherein the predicting comprises using a method of forecasting selected from a group consisting of at least one or more methods selected from the group consisting of the following methods: regression analysis, Monte-Carlo simulation, artificial neural network, recurrence quantification analysis, correlation dimension, and nonlinear autoregressive exogenous model.

12. One or more non-transitory computer-readable storage media storing computer-readable instructions that when executed by a computer, cause the computer to perform the method of claim 1.

13. A system for predictive analytics in an electrical grid network using a central processing unit configured to execute computer-executable instructions stored in a memory, the system comprising:
    an integration module configured to aggregate a plurality of events from the electrical grid network, the plurality of events comprising information related to adverse effects on equipment of the electrical grid network and measurements performed by the equipment, the integration module cleansing the plurality of events by modifying the incorrect event based on associated time stamp information;
    an analysis module configured to recognize one or more event patterns from one or more corrected events;
    a database configured to store the plurality of events; and
    a prediction module configured to predict a future event pattern based on at least one correlation of the plurality of event patterns.

14. The system of claim 13, wherein the integration module receives events from one or more information technology systems.

15. The system of claim 13, wherein the integration module receives events from one or more operations technology systems.

16. A computer-implemented method for monitoring performance and predicting reliability of equipment in electrical grid network, the method comprising:
    aggregating a plurality of events using measurements received from a plurality of equipment connected to an electrical grid network, the plurality of events comprising information related to adverse effects on equipment of the electrical grid network and measurements performed by the equipment;
    applying a time-slice parameter to the plurality of events;
    cleansing the plurality of events by modifying the incorrect event based on associated time stamp information;
    analyzing one or more corrected events to recognize a plurality of event patterns;
    serializing the plurality of event patterns in a database;
    predicting a future event pattern based on a correlation of the plurality of event patterns;

determining an accuracy parameter by comparing the predicted future event pattern with an actual event; and adjusting the time-slice parameter to increase the accuracy parameter.

17. The method of claim 16, wherein the plurality of events comprise events received from a measurement history database, an alerts database, an alarm database, and a weather history database.

18. The method of claim 16, wherein the plurality of event patterns is indicative of past and present events.

19. The method of claim 16, wherein the analyzing the plurality of events is performed using time domain correlation.

20. The method of claim 19, wherein the time domain correlation is performed using an auto correlation.

21. The method of claim 19, wherein the time domain correlation is performed using a cross correlation.

22. The method of claim 16, wherein the analyzing the plurality of events is performed using frequency domain correlation.

23. The method of claim 22, wherein the frequency domain correlation is performed using one or more mathematical transforms.

24. The method of claim 22, wherein the frequency domain correlation is performed using a Fast Fourier transform.

25. The method of claim 22, wherein the frequency domain correlation is performed using one or more Fractional Fourier transforms.

26. The method of claim 16, wherein the predicting comprises using a method of forecasting selected from a group consisting of at least one or more methods selected from the group consisting of the following methods: regression analysis, Monte-Carlo simulation, artificial neural network, recurrence quantification analysis, correlation dimension, and nonlinear autoregressive exogenous model.

27. One or more non-transitory computer-readable storage media storing computer-readable instructions that when executed by a computer, cause the computer to perform the method of claim 16.

28. A computer-implemented system for monitoring performance and predicting reliability of equipment in an electrical grid network using a central processing unit configured to execute computer-executable instructions stored in a memory, the system comprising:

an integration module configured to aggregate a plurality of events using measurements from at least one equipment component connected to an electrical grid network, the plurality of events comprising information related to adverse effects on equipment of the electrical grid network and measurements performed by the equipment, the integration module cleansing the plurality of events by modifying the incorrect event based on associated time stamp information;

an analysis module configured to apply a time-slice parameter to one or more corrected events to recognize at least one event pattern within the time-slice;

a database configured to store the time-slice parameter and the at least one event;

a prediction module configured to predict a future event pattern based on a correlation of the plurality of event patterns; and a feedback module configured to determine an accuracy parameter by comparing the predicted future event pattern with an actual event and to adjust the time-slice parameter to increase the accuracy parameter.

29. The system of claim 28, wherein the integration module receives events from one or more information technology systems.

30. The system of claim 28, wherein the integration module receives events from one or more operations technology systems.

* * * * *